United States Patent [19]

Scott et al.

[11] Patent Number: 4,811,193
[45] Date of Patent: Mar. 7, 1989

[54] VARIABLE FREQUENCY CONTROLLER

[75] Inventors: Junius D. Scott, Homer City; John D. Gotal, Indiana, both of Pa.

[73] Assignee: FMC Corporation, Chicago, Ill.

[21] Appl. No.: 491,463

[22] Filed: May 4, 1983

[51] Int. Cl.⁴ .............................. H02M 5/02
[52] U.S. Cl. .................... 363/165; 323/235
[58] Field of Search ............... 363/157, 158, 159, 160, 363/161, 162, 163, 164, 165; 323/235, 282, 283, 319; 377/42, 47, 52, 54; 307/106, 265, 269; 328/34, 63

[56] References Cited

U.S. PATENT DOCUMENTS

| | | | |
|---|---|---|---|
| 3,649,893 | 3/1972 | Lajoie | 318/119 |
| 3,908,158 | 9/1975 | Studtman | 363/160 |
| 3,950,657 | 4/1976 | Sheng et al. | 307/252 UA |
| 4,084,155 | 4/1978 | Herzl et al. | 377/42 |
| 4,204,141 | 5/1980 | Nuver | 307/265 |
| 4,231,104 | 10/1980 | St. Clair | 377/52 |
| 4,337,509 | 6/1982 | Omae et al. | 318/345 E |

FOREIGN PATENT DOCUMENTS 1488534  7/1969  Fed. Rep. of Germany .
2037491  7/1980  United Kingdom .

Primary Examiner—Peter S. Wong
Assistant Examiner—Judson H. Jones
Attorney, Agent, or Firm—Douglas W. Rudy; Richard B, Megley

[57] ABSTRACT

A circuit for operating an electromagnet of a feeder or vibrator incorporate phase control for a triac used for oscillating the feeder at line frequency or at a selectable subharmonic frequency.

9 Claims, 1 Drawing Sheet

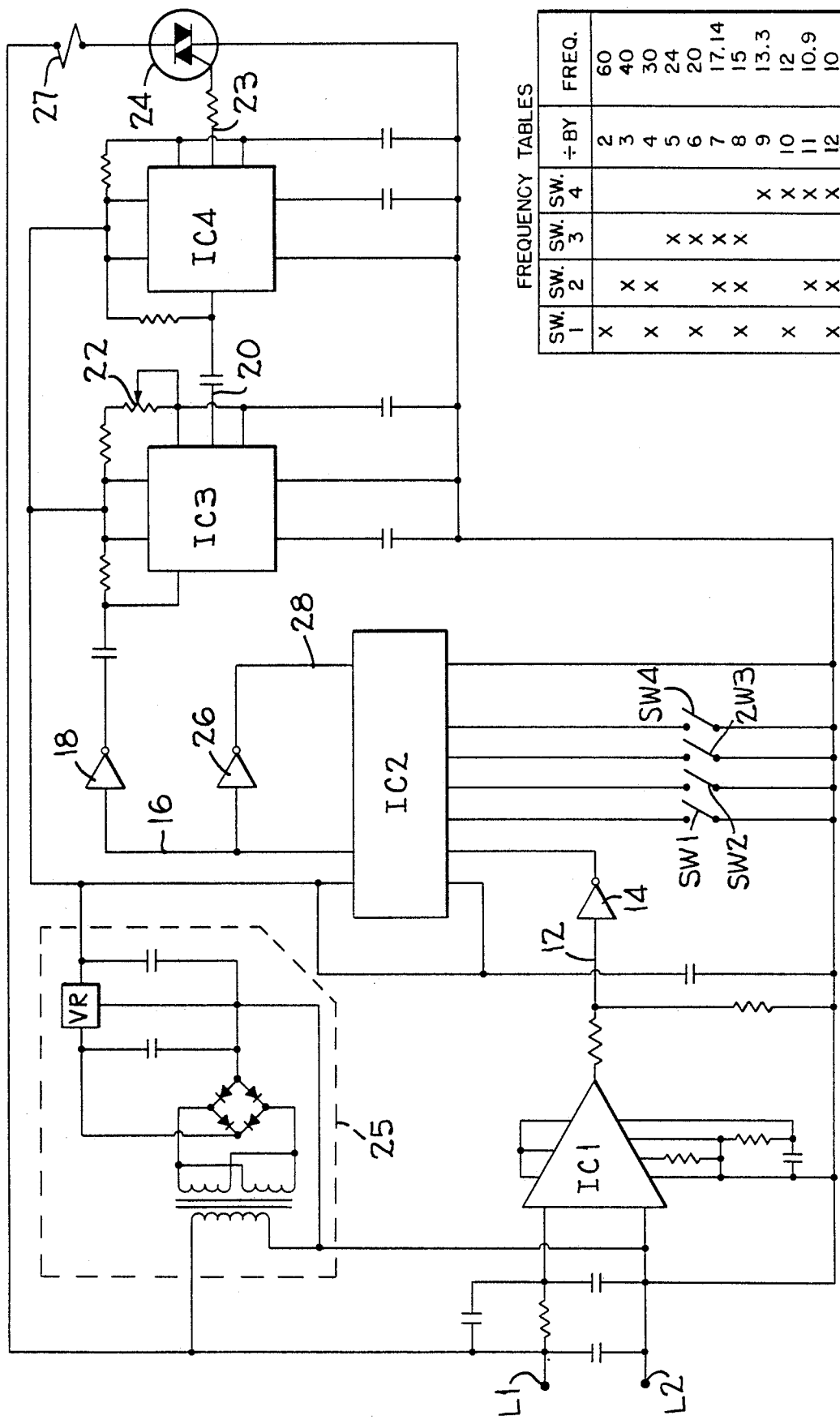

VARIABLE FREQUENCY CONTROLLER

CROSS-REFERENCE TO RELATED APPLICATION

This application is related to U.S. application Ser. No. 06/491,481 (Docket 37-9885) filed by J. D. Gotal and J. D. Scott.

BACKGROUND AND SUMMARY OF THE INVENTION

Certain types of vibratory material handling equipment, such as parts feeders, for example, utilize an electromagnet as the exciting force. The coil of the electromagnet is energized only during a portion of the time. When the frequency of this energization is reduced, longer strokes are possible and high feed rates are generally achieved. A lower frequency also reduces the stress on the mechanical system of the equipment and reduces the noise level resulting from its operation. A lower frequency also provides more efficient feeding of most materials. The optimum frequency will depend on a variety of factors, but one factor is the physical characteristics of the material being fed. In the past, a conventional type of variable frequency supply has required a large power supply or transistor bank.

The present invention provides a controller for an electromagnetic exciter which obviates the need for a large power supply or transistor bank and which provides a plurality of discrete operating frequencies.

BRIEF DESCRIPTION OF THE DRAWINGS

FIG. 1 is a schematic diagram of an electronic control circuit illustrating a preferred embodiment of the invention.

FIG. 2 is showing the operating frequencies obtainable from the circuit of FIG. 1.

DETAILED DESCRIPTION

Referring to FIG. 1, L1 and L2 represent a conventional single phase, 60 hertz alternating current electrical power source with L2 being the ground. A zero crossing network IC1, which preferably is a CA-3059, is connected to L1 and L2 and provides a pulse centered at each zero crossing point of the A.C. line. Because the 60 Hz source crosses zero twice in each cycle, the output pulse frequency appearing on line 12 is 120 Hz. This output is fed to a synchronous, presetable 4 bit (divide by 16) counter IC2, which may be a 74161N, through a voltage divider network and an inverter gate 14. The inverter 14 is necessary if the 4 bit counter IC2 triggers on a positive going edge, as the 74161N does, because the zero crossing detector IC1 produces a positive edge just before the zero line is crossed. The inverter 14, therefore, causes the counter IC2 to be triggered at the proper time relative to the AC line.

The output from the counter IC2 appears on line 16 and is fed to the input of a monostable multivibrator or one-shot timer IC3, which may be a 555 timer. An inverter 18 is also needed in the line 16 if the timer IC3 is triggered on a negative-going edge of the input pulse, as the 555 device is. The output pulse width of IC2 appears on line 20 and is varied by means of a phase control potentiometer 22. The negative edge of the positive square wave output by IC3 is used to trigger another one-shot timer IC4, which is preferably also a 555 timer. The timer IC4, has an associated resistance and capacitor recharge network selected to provide a fixed width output pulse on line 23 of short time duration, such as one milli-second, but of sufficient length to assure latching of the triac 24 during each conduction period. The triac 24 is triggered by the output, on line 23, of IC4 and is in series with the a coil 27 of the electromagnetic vibrator across the source L1 and L2. Thus, the coil 27 will be connected across the A.C. line whenever, and for as long as, the triac 24 is on. A conventional power supply 25 provides a regulated D.C. voltage to IC2, IC3 and IC4.

The output of the counter IC2 is generated as a carry signal from the counter, which is capable of counting up in binary from 0 to 15 and is also presetable to a specific count. The carry signal appears as a high on line 16 and is inverted by inverter gate 26 so the load line 28 goes low. When the line 28 goes low, the counter is preset to a binary number determined by the condition of switches SW1, SW2, SW3 and SW4. The next pulse from detector IC1 causes the counter ICZ to count up from the preset number. Each successive pulse advances the counter until a carry signal is generated as the count or number goes to fifteen. The preset number is determined by which of the switches SW1, SW2, SW3 and SW4 are closed. Those that are closed enter a zero, binarily weighted by position with the least significant being SW1 and the most significant SW4. The counter IC2 then advances, on the next pulse from the detector IC1, from that binary number which was entered in parallel, as determined by the position of the switches, when the load line 28 was brought low by the carry signal appearing on line 16. The table of FIG. 2 shows the frequencies obtainable with all combinations of switch condition; the X denoting a closed position for that switch.

While a preferred embodiment of the present invention is illustrated and described herein, it will be appreciated that various changes and modifications may be made therein without departing from the spirit of the invention as defined by the scope of the appended claims.

What is claimed is:

1. A frequency divider and phase control for an electromagnetic feeder having a coil operable from a single phase alternating current source, comprising:
    a zero crossing network connected to said source and producing a first pulse each time the source crosses zero;
    a synchronous presettable counter capable of counting to a limit connected to receive said first pulse and produce a carry signal when said limit is reached;
    monostable miltivibrator means comprising a phase shifting timer connected to receive said carry signal allowing a single pulse output, said monostable multivibrator means further comprising a gate pulse generator connected to said phase shifitng timer and generating a short latching pulse;
    a triac connected in series with said coil across said source and gated by said latching pulse; and
    means for presetting said counter to vary the frequency of the pulses to said triac.

2. The invention according to claim 1, wherein said monostable multivibrator means comprising a phase shifting timer having a potentiometer for generating a selectable pulse width.

3. The invention according to claim 2, wherein said monostable multivibrator means comprises a second timer for generating a short latching pulse to assure proper gating of said triac.

4. The invention according to claim 1, wherein said carry signal is also connected to load the preset word.

5. The invention according to claim 4, and also comprising:
switch means for selectively setting the preset word in said counter.

6. The invention according to claim 2, wherein said carry signal is also connected to load the preset word.

7. The invention according to claim 6, and also comprising:
switch means for selectively setting the preset word in said counter.

8. The invention according to claim 3, wherein said carry signal is also connected to load the preset word.

9. The invention according to claim 8, and also comprising:
switch means for selectively setting the preset word in said counter.

* * * * *